(12) United States Patent
Abe et al.

(10) Patent No.: US 8,388,730 B2
(45) Date of Patent: *Mar. 5, 2013

(54) PROCESS OF LEACHING GOLD

(75) Inventors: Yoshifumi Abe, Hitachi (JP); Hiroshi Hosaka, Hitachi (JP); Kazuaki Takebayashi, Hitachi (JP); Yasunari Ishiguro, Hitachi (JP); Akira Yoshimura, Hitachi (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 1008 days.

This patent is subject to a terminal disclaimer.

(21) Appl. No.: 12/216,447

(22) Filed: Jul. 3, 2008

(65) Prior Publication Data

US 2009/0241735 A1 Oct. 1, 2009

(30) Foreign Application Priority Data

Mar. 27, 2008 (JP) .................................. 2008-84817

(51) Int. Cl.
*C22B 11/00* (2006.01)
(52) U.S. Cl. .......................................... 75/744; 75/743
(58) Field of Classification Search .................... 75/744, 75/743
See application file for complete search history.

(56) References Cited

U.S. PATENT DOCUMENTS

| 5,487,819 | A | 1/1996 | Everett | |
|---|---|---|---|---|
| 7,682,420 | B2 * | 3/2010 | Abe et al. | 75/743 |
| 2007/0014709 | A1 * | 1/2007 | Moyes et al. | 423/22 |

FOREIGN PATENT DOCUMENTS

| AU | 2003287781 A2 | 7/2004 |
|---|---|---|
| JP | 2857930 B2 | 12/1998 |
| JP | 2005-298850 A | 10/2005 |
| JP | 2008-106347 A | 5/2008 |
| WO | WO-2004059018 A1 | 7/2004 |

OTHER PUBLICATIONS

Office Action issued in corresponding Canadian patent application No. 2,636,122 dated Feb. 23, 2010.
La Brooy et al., "Review of Gold Extraction from Ores," Minerals Engineering, vol. 7, No. 10, 1994, pp. 1213-1241.
Toraiwa et al., "Development of Hydrometallurgical Process of Copper Anode Slimes in Nippon Mining & Metals," Shigen-to-Sozai, vol. 116, No. 6, 2000, pp. 484-492.

* cited by examiner

*Primary Examiner* — Weiping Zhu
(74) *Attorney, Agent, or Firm* — Birch, Stewart, Kolasch & Birch, LLP

(57) ABSTRACT

A process of leaching gold comprising the steps of: a) leaching copper from copper sulfide ore material that contains gold or contains silicate ore containing gold until the copper grade is reduced to 7.9 wt % or less; b) mixing the resulting material having a copper grade of 7.9 wt % or less with a gold leaching solution selected from the group consisting of a first solution containing chloride ions and ferric ions, and a second solution containing chloride ions and iron ions, the iron ions having been oxidized to trivalent ferric ions by air bubbled into the second solution; c) adjusting the pH of the gold leaching solution to 1.9 or less with stirring to leach at least gold in the material into the gold leaching solution by the oxidative activity of the ferric ions contained in the gold leaching solution, wherein the concentration of gold is reduced by selectively removing gold from part or all of the gold leaching solution during gold leaching. This process efficiently leaches at least copper and gold from a copper sulfide ore.

9 Claims, 7 Drawing Sheets

Effects of copper grade in leach residue on gold leaching

Effects of copper grade in leach residue on gold leaching

Effects of bromide ions on gold leaching

Effects of iron concentration on gold leaching

Effects of pH on iron concentration

Effects of addition of activated carbon on gold leaching

Effects of addition of lead nitrate on gold leaching

Effects of particle size of material on gold leaching

PROCESS OF LEACHING GOLD

FIELD OF THE INVENTION

The present invention relates to a process of leaching and recovering gold out of gold-containing sulfide or silicate ores, particularly leaching gold at atmospheric pressure in an aqueous solution at a temperature below its boiling point.

BACKGROUND OF THE INVENTION

Copper sulfide ores and the accompanying silicate ores often contain gold. There are two main processes for recovering gold from such ores: One is to treat copper sulfide or silicate ores containing gold (herein after referred to as "material") at high temperatures above 1000° C. The material is melt with iron sulfide, or silicate ores for making up for the shortfall at such elevated temperatures to form $Cu_2S$ called matte and slag which is primarily composed of iron oxides or silicates and contains impurities. The matte is reduced at elevated temperatures to low-purity metallic copper called blister copper, which is refined by electrolysis into 99.99% or higher purity of metallic copper. Gold contained in the material behaves together with copper in the course of production of the metallic copper, and is recovered as a deposit, called copper electrolytic slime, together with other precious metals in the course of electrolysis.

The copper electrolytic slime is melt with lead at elevated temperatures, followed by concentration of the precious metals in the lead and removal of the lead through oxidation, resulting in a silver plate containing precious metals such as gold, called primary silver plate. The primary silver plate is electrolyzed to refine silver, in the course of which a deposit containing precious metals generates as silver electrolytic slime. From this deposit, precious metals other than gold are eluted with, for example, nitric acid, and then are melt at elevated temperatures to provide low-purity gold called primary gold plate, which in turn is subject to electrolysis to recover high purity gold.

However, this process has disadvantages of need for elevated temperatures above 1000° C., and substantively many steps to recover gold produced as a by-product in the process suited for production of metallic copper.

In the other process of recovering gold, the material is put into contact with a solution containing a complexing agent, which can readily form a gold compound, such as a cyanides, thiourea, or thiosulfuric acid, to allow such a agent react with react gold. The gold is eluted into the solution, and recovered through adsorption onto activated carbon.

Although this process can be free from any elevated temperatures and reduce the recovery steps, part of the agent for forming a gold compound will be consumed by other concomitant metallic elements such as copper and iron. Therefore, these other metallic elements must be removed to appropriate levels. In this case, additional steps of removing elements other than gold and recovering gold should be conducted (see "REVIEW OF GOLD EXTRACTION FROM ORES", S. R. La BROOY, H. G. LINGE and G. S. Walker, Minerals Engineering, Vol. 7, No. 10, pp. 1213-1241).

Another example is to conduct gold leaching in an aqueous halogen-containing solution by utilizing a tendency for gold to form soluble complexes with halogen elements to dissolve in the aqueous solution. In this case, oxidizing agents must be added for ionization of gold. Such oxidizing agents that can be used typically include those having a standard oxidation-reduction potential of over +900 mV, such as nitric acid, hydrogen peroxide, and chlorine. Under conditions containing such oxidizing agents, most metallic elements that are contained may be oxidized with the agents, which leads to consumption of excess amounts of oxidizing agents than that necessary for recovering gold (see "Dou Chindenbutsu Shissiki Shorigijutsu no Kakuritsu (Development of Hydrometallurgical Process of Copper Anode Slimes)", Akinori Toraiwa and Yoshifumi Abe, Shigen-to-Sozai, Vol. 116, (2000), No. 6, pp. 484-492).

Known as a so-called INTEC process, a leaching process has been proposed that involves generating elemental sulfur at a normal pressure, without cyanidation (Japanese Patent No. 2857930). The leaching solution that is used for gold leaching in this process has experienced copper electrowinning in a chloride bath for recovering copper. Such a solution has an oxidation-reduction potential of 700 mV, and leaches gold by higher oxidation-reduction potentials of halogen compounds (Halex: typically, $BrCl_2^-$) in the solution. Copper electrowinning in the chloride bath proceeds according to the following reactions:

At the cathode: $2Cu^+ + 2e^- \rightarrow 2Cu$ 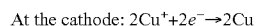

At the anode: $Br^- + 2Cl^- \rightarrow BrCl_2^- + 2e^-$ 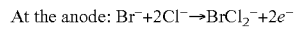

In gold leaching with Halex, the Halex is produced in a vessel used for electrodeposition recovery of copper, which requires complicated operations. Therefore, this process has a disadvantage of troublesome handling, and is not suitable for large-scale leaching.

AU Patent Application No. 2003287781 "Recovering Metals from Sulfidic Materials" discloses a process of leaching gold in a chloride bath, which requires special oxidizing agents such as gaseous oxygen and chlorine in order to improve the gold leaching rate.

Japanese Unexamined Patent Application Publication No. 2005-298850 discloses a process of leaching gold out of leach residues through a hydrometallurgical process for copper where these leach residues are processed with a solution containing ferric ions and thioureas. Gold leaching into the solution not only from such leach residues but also from a material allows copper and iron to consume some agents for eluting gold. Such agents for eluting gold into the solution, such as cyanides, thioureas, and thiosulfuric acid, are typically expensive, and copper and iron that consume the agents are present together with gold in higher amounts compared to the amount of gold, which leads to higher cost for gold recovery.

The applicant proposed the following process for gold leaching in Japanese Patent Application No. 2007-086983 (not published yet) filed on Mar. 29, 2007 which claims priority to Japanese Patent Application No. 2006-264423 filed on Sep. 28, 2006.

This is "a process of leaching gold comprising leaching copper from copper sulfide ore that contains gold or contains silicate ore containing gold until the copper grade in the copper sulfide ore is reduced to 7.9% or less; mixing the resulting copper sulfide ore having a copper grade of 7.9% or less with a solution containing chloride ions and ferric ions or with a solution containing chloride ions and iron ions in such a state that oxygen in the air bubbled into the solution oxidizes iron ions into trivalent ferric ions; adjusting the pH of the solution to 1.9 or less with stirring; and leaching at least gold into the solution by the oxidative activity of the ferric ions."

In the process in Japanese Patent Application No. 2007-086983, conventional processes of gold leaching are evaluated as follows.

(1) Such conventional processes consume large amounts of expensive agents.

(2) As a result of elution of copper and iron present in the form of sulfides, sulfur remaining on the surface of the material passivates the material, which may preclude the reaction. For this reason, copper and iron present are preliminarily eluted into the solution to reduce the contents of these metals prior to the gold leaching operation in order to reduce the amounts of the gold leaching agents to be consumed. Alternatively, some attempts have been made to avoid these problems by carrying out operations to remove sulfur from the material, such as roasting, in advance. Such operations, including complicated steps, cause high gold recovery cost and yield products from solutions of high acid concentrations. Aqueous solutions of such products are highly acidic. Since gold leaching operations are carried out in the alkaline pH range, the highly acidic solution must be neutralized prior to gold leaching operations. Agents used for neutralizing cause higher recovery cost.

(3) In addition, agents used, such as cyanides, thioureas, and thiosulfuric acids are expensive, readily degradable, and toxic, which requires rigorous steps during or after handling of the agents. This also cause higher process cost. In addition, a long reaction time leads to a long overall process time to the final product and increased gold holdup.

(4) Processes of leaching gold using halides and their gases such as chlorine and bromine have also been contemplated in that these reaction rates are higher than those for cyanides. In this case, use of halogen gases as oxidizing agents provides solutions in high oxidation states (in a chloride solution, the hydrogen standard potential of 1242 mV for gaseous chlorine, and 1070 mV for gaseous bromine), so that gold leaching can be accelerated. These processes also have disadvantages of use of expensive and strongly corrosive halogen gases, and thus difficult handling. Moreover, due to their high ionization potentials through the reaction, excess amounts of halogens cause the surface of the material to be passivated, which may inhibit the reaction from proceeding. Sometimes, iodine is used. In this case, iodine is consumed more than necessary by the reaction with iron contained as a gangue component in the material. In these processes, since such agents have very high oxidation potentials, oxygen is not an effective oxidizing agent. Even when these agents are reduced during the leaching reaction, oxygen in the air fails to oxidize their reduced forms, so that they cannot be reused in a simple way. The process disclosed in Japanese Unexamined Patent Application Publication No. 2005-298850 can solve these problems.

SUMMARY OF THE INVENTION

An object of the present invention is to provide a process of leaching gold out of copper sulfide ore with higher efficiency by improving the process disclosed in Japanese Patent Application No. 2007-086983.

The present invention, which solves the problems above, provides:

(1) A process of leaching gold comprising the steps of:
a) leaching copper from copper sulfide ore material that contains gold or contains silicate ore containing gold until the copper grade is reduced to 7.9wt % or less;
b) mixing the resulting material having a copper grade of 7.9 wt % or less with a gold leaching solution selected from the group consisting of a first solution containing chloride ions and ferric ions, and a second solution containing chloride ions and iron ions, the iron ions having been oxidized to trivalent ferric ions by air bubbled into the second solution;
c) adjusting the pH of the gold leaching solution to 1.9 or less with stirring to leach at least gold in the material into the gold leaching solution by the oxidative activity of the ferric ions contained in the gold leaching solution, wherein the concentration of gold is reduced by selectively removing gold from part or all of the gold leaching solution during gold leaching;

(2) In one embodiment of the process, steps a) and b) are replaced by the following steps comprising:
a') leaching the copper sulfide ore material by a leaching solution containing chloride ions and iron ions to form a third solution (hereafter called "gold leaching solution");

b') oxidizing the gold leaching solution by bubbling with air to oxidize iron ions into trivalent ferric ions by the action of oxygen contained in the air;

(3) In another embodiment of the process, the gold leaching solution contains copper ions;

(4) In a further embodiment of the process, the gold leaching solution contains bromide ions;

(5) In a further embodiment of the process, the gold leaching solution contains iron ions in a concentration of 0.01 g/l or more;

(6) In a further embodiment of the process, it may further comprise bubbling the gold leaching solution with air to oxidize divalent iron ions into trivalent iron ions during said stirring;

(7) In a further embodiment of the process, the gold leaching solution contains chloride ions and bromide ions in a concentration of 120 g/L to 200 g/L in total;

(8) In a further embodiment of the process, the leaching temperature is 60° C. or more;

(9) In a further embodiment of the process, it may further comprise adding activated carbon with or without lead nitrate to the gold leaching solution;

(10) In a further embodiment of the process, it may further comprise comminuting the material until 80% or more of the material has a particle size of 40 μm or less.

DESCRIPTION OF THE PREFERRED EMBODIMENTS

Figure 1:
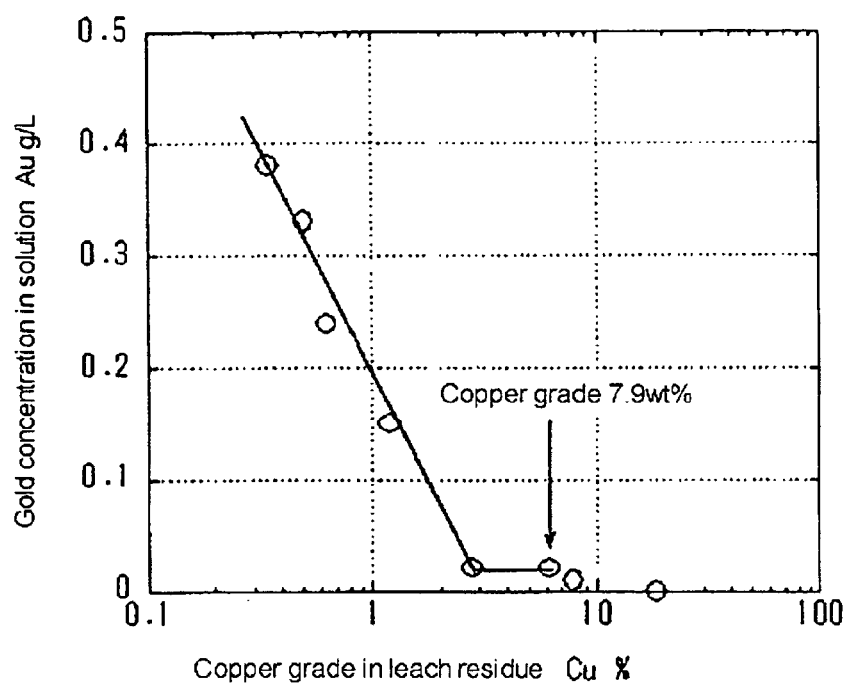
FIG. 1 is a graph that shows an effect of the copper grade in a leach residue on gold leaching.

Now, the present invention will be described in detail.

The material to be treated according to the present invention is copper sulfide ore that contains gold or contains silicate ore containing gold. Any leaching process allows such material to have a copper grade of 7.9% or less. For leaching copper out of such copper sulfide ore, various processes have been presented, for example, an oxidative leaching process by bubbling oxygen into a sulfuric acid solution, or by adding copper chloride or iron chloride to a chloride solution, and then using gaseous chlorine or oxygen, and these can be employed accordingly. Any of these processes can be applied to leaching copper out of copper sulfide ore. A chloride bath is preferred to a sulfuric acid bath, which causes a low leaching rate. The sulfuric acid bath leaching involves the treatment by this process for leach residue, while the chloride bath leaching involves the treatment by this process for the entire leaching solution containing leach residue.

In the present invention, gold is leached from a leachate having a reduced copper grade of 7.9% or less with a solution containing both chloride ions and trivalent iron ions. The leaching solution is a first solution containing chloride ions and ferric ions, or a second solution containing chloride ions and iron ions in such a state that air bubbled into the solution oxidizes iron ions into trivalent iron ions. These solutions can elute gold when mixed with a solution containing copper ions and/or bromide ions, if necessary.

Leaching of gold in a copper concentrate requires a suitable oxidizing agent, and a stabilizing agent that prevents precipitation of metallic gold produced by the reduction of the leached gold. In the present invention, chloride ions are used for stable leaching of gold through formation of gold chloride, whereas combined use with bromide ions can further facilitate gold leaching through formation of gold bromide.

In a solution called a chloride bath which contains chlorides, the oxidation potential of the reaction differs from that in aqueous systems. It is known that the standard oxidation potential of $Au^{3+}/Au$ (representing the oxidation-reduction system $Au^{3+}+3e\rightarrow Au$; hereinafter the same shall apply), for example, is 1500 mV in an aqueous system, whereas that of $AuCl_4^-/Au$ decreases to 1000 mV in a chloride bath. This explains an oxidizing agent having less oxidative activity than that of an aqueous system can leach gold. In fact, it is also known for gold bromide that, the standard oxidation potential expressed by $AuBr_4^-/Au$ further decreases to 870 mV. For this reason, gold can be leached with an oxidizing agent having a low oxidative activity through formation of a chloride or bromide complex of gold.

However, since even the standard oxidation potential where a chloride complex is formed is 1000 mV, an oxidizing agent having an oxidative activity such that its standard oxidation potential is beyond 1000 mV, such as hydrogen peroxide, gaseous chlorine or gaseous bromine, or nitric acid having an oxidation potential close to the value (960 mV) is used even in leaching with the help of chloride or bromide complexes of gold. In the process of Japanese Unexamined Patent Application Publication No. 2005-298850, use of Halex enables gold to be leached at an oxidation-reduction potential of about 700 mV.

The inventors proposed in Japanese Patent Application No. 2007-086983 that gold leaching with an aqueous solution containing chloride ions can employ trivalent iron ions as an oxidizing agent, and be achieved at a very low oxidation potential compared to conventional processes, and that addition of bromide ions allows gold leaching to be achieved at a lower oxidation potential, resulting in a higher rate of the gold leaching.

The concentration of bromide ions used in this reaction, which are required to form gold bromide and complexes with eluted gold, depends in part on the concentration of gold to be eluted. The solubility, which is affected by the concentration of sodium chloride that is present together, has its upper limit. In consideration of the solubility, the amount of the agent used may be 1 g/l to 80 g/l, and desirably about 10 g/l to 26 g/l from the viewpoint of economy.

Chloride ions are added in order to leach gold through formation of gold chloride and chloride complexes with gold. In order to promote oxidation of iron through addition of copper, stabilization of cuprous compounds produced by the reaction is required. For this purpose, chloride ions are added. The concentration of chloride ions is in the range of 1 to 6.5 mol/l, and preferably 3.3 mol/l (118 g/l) to 5.2 mol/l (186 g/l) from the viewpoint of stability of cuprous compounds. Chloride ions at a concentration exceeding 5.2 mol/l are deposited as crystalline sodium chloride as the concentration of metal ions increases during the reaction. Therefore, the concentration of chloride ions in the solution will not increase.

Gold leaching can be achieved with iron ions at a concentration of 0.01 g/l or more, but a higher concentration is preferred for higher reactivity. However, a concentration of or about 0.26 g/l is preferred because the effect of iron concentration on the rate of gold leaching reaches its culmination at a concentration of 0.26 g/l or more, though the reactivity is not particularly improved at this concentration. When iron is contained in the material, the leached iron out of the material acts as an oxidizing agent. For this reason, iron compounds are not always required to be added in advance.

Addition of copper ions is desirable because the presence of copper ions increases the oxidation rate of iron ions, though copper ions are not directly involved in gold leaching. Though the concentration will not be particularly specified, about 5 to 20 g/l is sufficient.

The point of the reaction by mixing a leach residue having a reduced copper grade in the copper sulfide ore of 7.9% or less with a solution containing trivalent iron ions and chloride ions to leach gold out of the leach residues is to keep the oxidation-reduction potential of the solution determined by an activity ratio ($[a(Fe^{3+})]/[a(Fe^{2+})]$) of trivalent iron to divalent iron higher than the formation potential for chloride or bromide complexes of gold.

When the activity ratio ($[a(Fe^{3+})]/[a(Fe^{2+})]$) of trivalent iron to divalent iron is reduced with the progress of the reaction, oxygen can be bubbled into the solution to increase the concentration of trivalent iron according to the following reaction formula 1 representing the reaction with protons ($H^+$) present in the solution in order to keep the oxidation-reduction potential of the solution at the level above. Oxygen contained in the air is sufficient.

$$Fe^{2+}+H^++(1/4)O_2\rightarrow Fe^{3+}+(1/2)H_2O \qquad \text{reaction formula 1}$$

Addition of acids such as hydrochloric acid can provide protons. Protons are consumed as the oxidation proceeds, so that the pH of the solution increases. Addition of acids such as hydrochloric acid keeps the pH of the solution constant, to achieve the reaction of formula 1. The pH may be 1.9 or less, but desirably in the range of pH 0.5 to 1.9 because the oxidation rate of iron is accelerated at a higher pH.

Additionally, when the material contains elements such as iron or copper, these elements are leached into an aqueous solution by ferric chloride or cupric chloride, respectively. After substantial completion of the elution, gold leaching can start.

The presence of chloride or bromide ions decreases the oxidation potential of gold by formation of complexes with gold, and these ions remain in the solution because they do not experience reactions such as gasification or precipitation. Accordingly, they are not exhausted. Furthermore, these components do not evaporate into the atmosphere because they are not used in gaseous state. Even if they are coordinated with metal elements such as copper or iron, bromide ions are liberated by reduction for copper or hydrolysis for iron, resulting in no loss.

Bromide ions are added in the form of sodium bromide, and a higher concentration of bromide ions is desirable. However, the solubility varies with the concentration of chloride ions that are co-added, and the temperature. In practice, the concentration of bromide ions may be 1 to 50 g/l, and preferably 10 to 26 g/l.

Chloride ions are preliminarily added in the form of sodium chloride in order to stabilize metal elements used as an oxidizing agent such as iron or copper, which is converted to cuprous chloride through oxidation.

The concentration of chloride ions added is adjusted such that the total concentration of chloride ions including chloride ions contained in iron chloride or copper chloride is 1 to 6.5 mol/l, and preferably 3 to 6 mol/l. Above the upper limit, crystalline sodium chloride will form when copper or iron is eluted as a result of the reaction because the solubility of sodium chloride is affected by both the concentration of copper chloride and the concentration of iron.

Iron ions are added as an oxidizing agent for eluting gold into a solution, and the concentration is sufficiently about 0.01 to 0.26 g/l as the concentration of iron. A higher concentration does not enhance the effect on the reaction or preclude the reaction. For the material containing and eluting iron, iron ions are not required to be added in advance.

Copper ions act as an oxidizing agent and also as a catalyst for oxidation of divalent iron ions. Copper ions present together divalent iron increase its oxidation rate, which is originally very low. Copper ions from copper chloride contributes to leaching of iron or copper sulfides present in the material, which allows for effective gold leaching. Cupric chloride leaches copper sulfide, and is finally converted to cuprous chloride as described in formulae 2 to 4.

$$CuS+CuCl_2 \rightarrow 2CuCl+2S \quad \text{reaction formula 2}$$

$$Cu_2S+2CuCl_2 \rightarrow 4CuCl+S \quad \text{reaction formula 3}$$

$$CuFeS_2+3CuCl_2 \rightarrow 4CuCl+FeCl_2+S \quad \text{reaction formula 4}$$

The cuprous compound stabilized in the solution facilitates the leaching. The concentration of chloride ions as described above is necessary to stabilize the cuprous chloride To the solution thus prepared, the material described above is added, and the mixture is heated to a temperature of 60° C. or more, followed by bubbling with air with stirring.

During the reaction, hydrochloric acid is then added to adjust the pH into 1.9 or less, and if possible, within 0.5 to 1.9. In such a range of the pH, the oxidation of iron can be accelerated. The iron in the solution is precipitated in the form of hydroxide depending on the pH, and the precipitation liberates protons (expressed by HCl in the formula) (formulae 5 and 6). These protons can be effectively used to oxidize cuprous or ferrous compounds.

$$FeCl_3+3H_2O \rightarrow Fe(OH)_3+3HCl \quad \text{reaction formula 5}$$

$$FeCl_3+2H_2O \rightarrow FeOOH+3HCl \quad \text{reaction formula 6}$$

Trivalent iron ions are used as an oxidizing agent for leaching gold, while copper ions are used for promoting oxidation of iron ions; both these ions cause oxidation. As a result, iron is reduced to divalent iron ions, and copper to univalent copper ions. However, according to formula 1 or formula 7, iron can be oxidized to trivalent ions, and copper to divalent ions. This elucidates that the leaching reaction can be continued.

$$Cu^+ + H^+ + (1/4)O_2 \rightarrow Cu^{2+} + (1/2)H_2O \quad \text{reaction formula 7}$$

Furthermore, it is known that oxygen consumed during the reaction can be supplied from air.

In the process of Japanese Patent No. 2857930, a harmful halogen compound that is difficult to handle during leaching (Halex, typically $BrCl_2^-$) is used to improve the rate of leaching gold at a high oxidation-reduction potential of 700 mv (vsAg/AgCl) (Example 4), whereas according to the present invention, gold can be readily leached at an oxidation-reduction potential 550 mv (vsAg/AgCl) only by air bubbling.

In the process of AU App 2003287781, the leaching rate of gold is 59% with air and oxygen only, and increases to 95% with chlorine that is a strong oxidizing agent and harmful. In contrast, according to the present invention, gold can be leached at a higher rate only by air bubbling.

Furthermore, after filing Japanese Patent Application No. 2007-086983, the inventors have found the following fact through intensive experiments, as described above. When gold is recovered from part or all of a solution after gold leaching, the reaction rate is accelerated and the leaching rate of gold is also improved at a low gold concentration in the solution.

That is, gold is leached, and then the resultant leaching solution is subject to further gold leaching in conventional processes, whereas the process of the present invention selectively recovers gold from the leaching solution during gold leaching, which leads to recovery of the target gold and a reduction in the concentration of gold in the leaching solution. Various recovery processes can be used, for example, (1) a process including solid-liquid separation of the slurry after leaching, and addition of a new leaching solution to the leach residue to continue the leaching; (2) a process including addition of activated carbon or ion exchange resin to a leaching solution, and adsorption of gold on the activated carbon or ion exchange resin; (3) the process (2) further including addition of lead nitrate; and (4) a process including solid-liquid separation of part of a leaching solution, and recovery of gold from the solution through electrowinning, solvent extraction, and activated carbon adsorption, or with ion exchange resin, and recycle of the leached solution to the original leaching solution.

Such recovery processes are directed to the entire solution in a leaching vessel for a one-step process, in which gold is selectively removed, but the volume of the solution itself does not fluctuate. On the other hand, gold is selectively removed from the leaching solutions in some of a plurality of vessels, and preferably in all of the vessels for a multistep process in a counter-current or co-current manner.

For the recovery timing, preferably selective removal of gold is continuously carried out during leaching operations. However, in the process (4), it may be intermittently carried out.

For the process (2), activated carbon is separated from the leach residue by screening, and gold can be recovered from the resultant activated carbon. The present invention is characterized by adding activated carbon for leaching gold in a chloride bath, and selectively removing gold to increase the leaching rate of gold, although adsorption of gold with activated carbon by cyanidation, for example, is well known.

The present invention can accomplish higher leaching rates of gold in a short time in addition to the following advantages (1) to (9) of Japanese Patent Application No. 2007-086983 (not published yet) which underlies the present invention. That is, the present invention can increase the leaching rate of gold in the leaching solutions at concentrations disclosed in Japanese Patent Application No. 2007-086983. The present invention also have an advantage of capable of recovering gold even by the present process of decreasing the gold concentration in the leaching solutions (first to third solutions), which is a gold recovery process itself.

(1) A gold-containing copper sulfide ore can be treated with an aqueous solution containing chloride ions and iron ions to efficiently leach gold or copper without an oxidizing agent that is usually used, such as hydrogen peroxide or nitric acid, nor a complexing agent such as a cyanide, thioureas, or thiosulfuric acid.

(2) A leaching solution containing chloride and iron ions effective for leaching gold, can leach copper and iron from a copper sulfide ore containing copper and iron. Accordingly, a single solution can leach all of copper, iron, and gold, and the process can be simplified to reduce the process time. This can also save cost of equipment.

(3) A leaching containing copper ions and/or bromide ions can facilitate gold leaching. Therefore, reactors used for the process can be downsized due to reduction in the process time, to save cost of equipment.

(4) Iron and copper in the material can be leached into the leaching solution, and then utilized for leaching gold. This leads to reduction in chemicals costs.

(5) Among chemicals used in the process, such as chlorine or bromine, bromides, which produce bromide ions, are expensive. However, such bromides can be left in the form of bromide ions in the leaching solution and be hardly exhausted at the stage of recovering individual metal ions from the solution, even if these bromides are coordinated to metal elements in larger amounts in the leaching solution such as copper or iron compared to the gold concentration. For example, iron can be separated in the form of its hydroxide by precipitation, and copper can be recovered in the form of metal by electrowinning or substitution with base metals. In these steps, bromide ions are liberated and remain in the solution.

(6) The gold leaching is carried out through oxidation with trivalent iron, and gold is eluted in the form of gold chloride or gold bromide. Copper promotes the oxidation with iron. These iron and copper ions are reduced to divalent iron and univalent copper ions respectively by leaching reaction. Each of the reduced iron and copper ions can be oxidized with protons in the solution and oxygen in the air, and recycled as oxidizing agents. Sufficient protons to oxidize divalent iron ions or univalent copper ions can be supplied by keeping the pH of the solution to 1.9 or less.

(7) Since the gold leaching is carried out in the oxidizing range for copper chloride or iron chloride, the oxidation potential of the leaching solution can be +480 mV or more (based on silver/silver chloride standard electrode), and does not require any chemicals having higher oxidation potentials above +778 mV based on silver/silver chloride standard electrode, and +1000 mV based on hydrogen electrode, such as gaseous chlorine or gaseous bromine.

(8) The process can leach gold from the material containing gold and copper or iron or sulfur in a single step without substantial consumption of chemicals, any pretreatment, or use of corrosive or toxic gases as an oxidizing agent.

(9) After metal elements are eluted in a solution containing chloride ions or bromide ions by oxidation reaction, elemental sulfur is left. However, it is known that the sulfur can not cover the material unlike a solution containing sulfuric acid, and remains porous even when the reaction proceeds, so that the eluate can permeate the material and the reaction is not inhibited by passivation.

Now, the present invention will be described in further detail with reference to Reference Examples and Examples.

EXAMPLES

Example 1

Reference Example

A leaching solution containing cupric chloride in a copper concentration of 25 g/l, ferric chloride in an iron concentration of 2 g/l, chloride ions including those from the cupric chloride and ferric chloride in a chloride ion concentration of 180 g/l in total, and sodium bromide in a bromide ion concentration of 22 g/l was prepared. To 9 L of the leaching solution, 1,260 g of a copper concentrate having a composition of 31.7 wt % Cu, 17.5 wt % Fe, 22.1 wt % S, and 66 g/t of Au as a material was added.

The copper concentrate was composed of 15% chalcopyrite ($CuFeS_2$) and 35% chalcocite ($Cu_2S$) as copper sources, in addition to 18% silicate ore, and 32% pyrite ($FeS_2$). Out of gold, 15% is present in the pyrite, and 85% is present throughout the other ores.

The leaching solution was heated to 85° C. and then the concentrate material was added with stirring. Analyte was sampled from the mixture with stirring and air bubbling to determine the gold concentration in the solution and the copper grade of the leach residue. Table 1 shows the results.

TABLE 1

Results of measurement in Example 1

| Reaction time hrs. | Temperature °C. | ORP mV | pH | Cu grade in leach residue wt % | Au concentration in solution mg/L |
|---|---|---|---|---|---|
| 3 | 85 | 423 | 1.5 | 19 | 0.00 |
| 3 | 85 | 413 | 1.5 | 7.9 | 0.01 |
| 3.4 | 85 | 451 | 2.0 | 6.2 | 0.02 |
| 3.4 | 85 | 459 | 1.7 | 2.8 | 0.02 |
| 5 | 85 | 514 | 2.0 | 1.2 | 0.15 |
| 6 | 85 | 459 | 1.5 | 0.63 | 0.24 |
| 12 | 85 | 528 | 1.5 | 0.50 | 0.33 |
| 16 | 85 | 533 | 1.5 | 0.35 | 0.38 |

ORP is measured with Ag/AgCl reference electrode.

Table 1 shows that as the copper grade of the leach residue decreases, gold leaching proceeds and the gold concentration in the solution increases. FIG. 1 illustrating this example shows that at a copper grade of the leach residue of 7.9%, gold leaching has already stared, and even at 1.2%, it is significant. Now, a linear approximated equation of the values determined at a copper grade of 2.8% or less is represented by [Au concentration (mg/l)]=0.1900-0.3993×log [Cu grade in the leach residue (%)]. The intersection point of a gold concentration of 0 mg/l with the horizontal axis is 3.0%. This indicates that gold leaching can substantially proceed at a copper grade of 7.9% or less in the leach residue as shown in Table 1, although it is significant at a copper grade of 3.0% or less in the leach residue.

In addition, the reaction is carried out at about no more than 533 mV, and does not require any oxidizing agents having high oxidation potentials of over 1000 mV, unlike conventional processes.

Example 2

Reference Example

A leaching solution containing cupric chloride in a copper concentration of 31 g/l, chloride ions including those from the cupric chloride in a chloride ion concentration of 186 g/l in total, and sodium bromide in a bromide ion concentration of 26 g/l was prepared. To 10 L of the leaching solution, 712 g of a copper concentrate having a composition of 15 wt % Cu, 19 wt % Fe, 17 wt % S, and 82 g/t of Au as a material was added.

The leaching solution was heated to 85° C. and then the concentrate material was added with stirring. The leaching was carried out with air bubbling. Hydrochloric acid was added to adjust the pH within the range of 0.5 to 2. Table 2 shows the results of this example.

TABLE 2

Results of measurement in Example 2

| Reaction time hrs. | Temperature °C. | ORP mV | pH | Grade in leach residue Cu wt % | Au g/t | Concentration in solution Fe g/L | Au mg/L |
|---|---|---|---|---|---|---|---|
| 0 | 78 | 595 | 1.3 | 15.0 | 82 | 0 | 0 |
| 0.1 | 85 | 451 | 1.7 | 7.6 | 94 | — | 0.02 |
| 0.7 | 85 | 475 | 1.5 | 2.1 | 76 | 0.28 | 0.02 |
| 1.7 | 85 | 514 | 1.5 | 1.2 | 63 | — | 0.15 |
| 2.7 | 85 | 557 | 1.7 | 1.0 | 43 | 0.04 | 0.32 |

ORP is measured with Ag/AgCl reference electrode.

The results in Table 2 show that gold leaching takes place by air bubbling at a copper grade of 7.9% or less in the leach residue in the presence of iron in the leaching solution (indicated by the reaction time of 0.7 hrs in Table 2) even at an initial copper grade exceeding 7.9% at the beginning of leaching.

Example 3

Inventive Example

To 4 L of a leaching solution containing no bromide ion, 524 g of a copper sulfide ore (22.1 wt % Cu, 23.4 wt % Fe, 29.1 wt % S, and 73 g/t of Au) was added, and the mixture was heated to 85° C. to carry out leaching with air bubbling. The composition of the leaching solution was as follows: cupric chloride in a copper concentration of 5.1 g/l, ferric chloride in an iron concentration of 5.1 g/l, and the total chloride concentration of 126 g/l by addition of sodium chloride. The reaction mixture was filtered every 20 hours, and each of the resulting leach residues was mixed with a fresh leaching solution having the same composition, and was subject to further leaching. Table 3 shows the result of this measurement.

TABLE 3

Results of measurement in Example 3

| Reaction time hrs. | Temperature ° C. | ORP mV | pH | Grade in leach residue | | Concentration in solution | |
|---|---|---|---|---|---|---|---|
| | | | | Cu wt % | Au g/t | Fe g/L | Au mg/L |
| 0 | 55 | 752 | 1.4 | 22.1 | 73 | 5.1 | 0 |
| 20 | 84 | 553 | 1.0 | 0.16 | 71 | 1.2 | 1.5 |
| 40 | 86 | 541 | 1.1 | 0.08 | 64 | 6.5 | 1.5 |
| 60 | 84 | 541 | 1.1 | 0.04 | 42 | 5.6 | 0.6 |
| 80 | 83 | 544 | 1.1 | — | 37 | 5.8 | 0.4 |

ORP is measured with Ag/AgCl reference electrode.

A decrease in the copper grade can lead to gold leaching without bromide ions. The leached gold, however, seems somewhat unstable, and the gold grade in the leach residue fluctuates.

Example 4

Reference Example

Gold was leached by mixing 438 g of a copper sulfide ore having a preliminarily decreased copper grade (0.23 wt % Cu, 34 wt % Fe, 42 wt % S, and 20 g/t of Au) with a leaching solution prepared with ferric chloride, sodium chloride and sodium bromide having an iron concentration of 5.7 g/l, a chloride concentration of 183 g/l, and a bromide concentration of 24 g/l. With air bubbling, the leaching was continued without replacing the leaching solutions. During the leaching, cupric chloride was added in a copper concentration of 5 g/l when 3 hours had passed.

TABLE 4

Results of measurement in Example 4

| Reaction time hrs. | Temperature ° C. | ORP mV | pH | Grade in leach residue | | Concentration in solution | | |
|---|---|---|---|---|---|---|---|---|
| | | | | Cu wt % | Au g/t | Fe g/L | Cu g/L | Au mg/L |
| 0 | 84 | 639 | 0.8 | 0.23 | 20 | 5.7 | 0 | 0 |
| 1 | 84 | 444 | 1.1 | 0.19 | 19 | 6.6 | 0.1 | 0.56 |
| 2 | 87 | 453 | 1.1 | 0.22 | 18 | 6.1 | 0.02 | 0.47 |
| 3 | 86 | 456 | 1.1 | 0.17 | 17 | 5.7 | 0.02 | 0.76 |
| 4 | 83 | 518 | 1.0 | 0.18 | 12 | 4.3 | 5.8 | 1.2 |

ORP is measured with Ag/AgCl reference electrode.

The results in Table 4 show that merely 3 g/t of gold based on the grade in the leach residue can be leached for three hours in the case of addition of only iron ions as metal ions, whereas substantially the same amount of gold can be leached in one hour in the case of further addition of copper ions. Likewise, addition of only iron ions brings about an increase in the gold concentration in the solution, up to 0.76 mg/l for three hours, whereas further addition of copper ions brings about a comparable increase within one hour. This explains the phenomena in terms of change in the grade in the leach residue. Consequently, addition of copper ions can increase the leaching rate of gold.

Example 5

Inventive Example

With 524 g of a copper sulfide ore as used in Example 3 and 4 L of a leaching solution having a similar composition to that used in Example 3 and further containing bromine, the leaching test of gold was carried out. The leaching solution contained cupric chloride in a copper concentration of 4.8 g/l, ferric chloride in an iron concentration of 4.9 g/l, and the total chloride concentration of 118 g/l by addition of sodium chloride. The leaching was conducted, without addition of bromine, for 20 hours during which the copper grade decreased, and bromide ions were added after the effect of the copper grade was eliminated. The bromide concentration was adjusted to 22 to 25 g/l by adding sodium bromide. As in Example 3, the reaction mixture was filtered every 20 hours, and each of the resulting leach residues was directly used for a further leaching with a fresh leaching solution. Table 5 shows the results.

TABLE 5

Results of measurement in Example 5

| Reaction time hrs. | Temperature ° C. | ORP mV | pH | Grade in leach residue | | Concentration in solution | | |
|---|---|---|---|---|---|---|---|---|
| | | | | Cu wt % | Au g/t | Fe g/L | Br g/L | Au mg/L |
| 0 | 84 | 737 | 1.2 | 22.1 | 73 | 4.9 | 0 | 0 |
| 20 | 86 | 518 | 1.1 | 0.18 | 66 | 5.5 | 0 | 1.0 |
| 40 | 85 | 476 | 1.0 | — | 52 | 7.1 | 22 | 0.7 |
| 60 | 84 | 482 | 0.9 | — | 37 | 7.2 | 22 | 2.5 |
| 80 | 86 | 479 | 1.0 | — | 21 | 6.1 | 25 | 0.5 |

ORP is measured with Ag/AgCl reference electrode.

Figure 2:
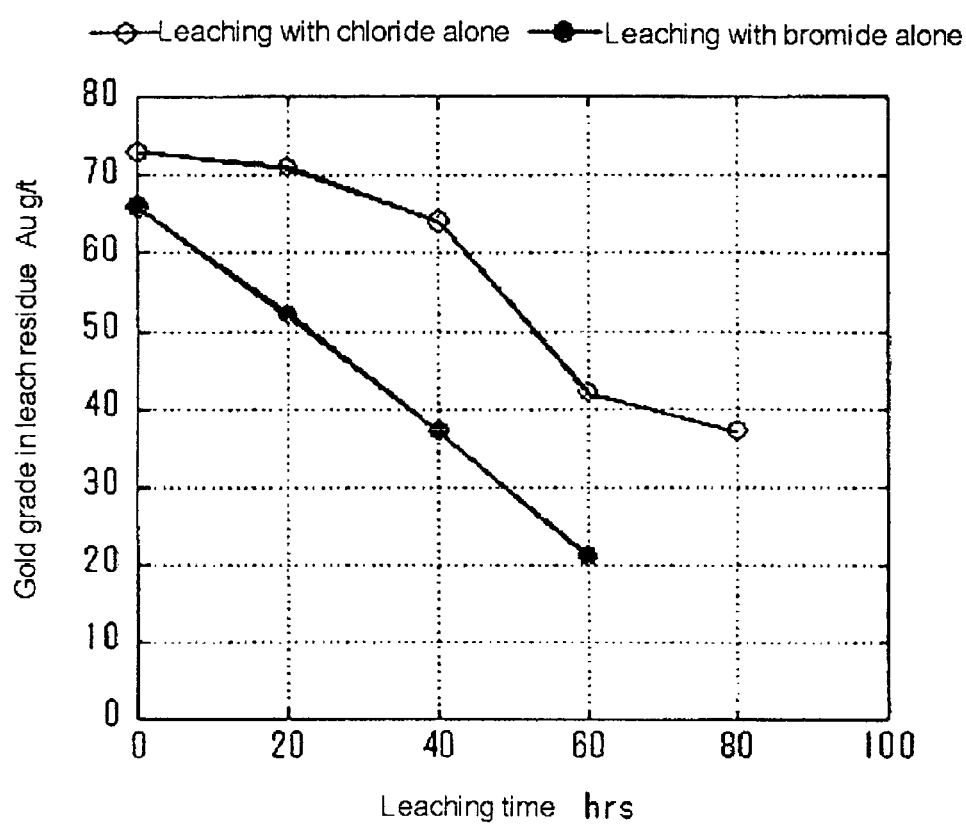
FIG. 2 is a graph that shows an effect of bromide ions on gold leaching.

In the process of Example 3 without addition of bromide, the gold grade was reduced to 36 g/t after 80-hours leaching. On the other hand, in the process of Example 5 involving addition of bromide ions to a chloride ions-containing solution, the gold grade was reduced to 21 g/t after 80 hours, and was reduced by 45 g/t even after 60 hours from addition of bromide ions. FIG. 2 shows the results of this comparison.

Example 5 has a leaching rate of gold of 0.75 g/t/hr, which is 1.6 times higher than 0.46 g/t/hr in Example 3 not containing bromide ions. In fact, the gold grade in the leach residue gradually decreases in Example 3. It is suggested that the presence of bromide ions will lead to a higher stability of the gold complexes formed in the solution.

Example 6

Reference Example

With a leach residue (12 wt % Cu, 26 wt % Fe, 31 wt % S, and 50 g/t of Au) prepared by leaching from a copper sulfide ore that had a decreased copper grade not affecting the gold leaching, and a solution (28.8 g/l of Cu, 166 g/l of Cl, and 20.6 g/l of Br) containing cupric chloride, sodium chloride, and sodium bromide, the effect of the iron concentration was evaluated at various iron concentrations. The iron concentration was controlled by adjusting the pH through addition of an aqueous sodium hydroxide or hydrochloric acid. Leaching was conducted with stirring and air bubbling, keeping the temperature at 85° C. for 15 hours. Table 6 shows the results.

TABLE 6

Results of measurement in Example 6

| pH | Concentration in solution Fe g/L | Grade in leach residue Au g/t |
|---|---|---|
| 0.9 | 3.0 | 14 |
| 1.0 | 1.8 | 14 |
| 1.1 | 1.3 | 13 |
| 1.4 | 0.49 | 14 |
| 1.6 | 0.18 | 18 |
| 1.7 | 0.22 | 16 |
| 1.7 | 0.09 | 21 |
| 2.0 | 0.01 | 43 |

Figure 3:
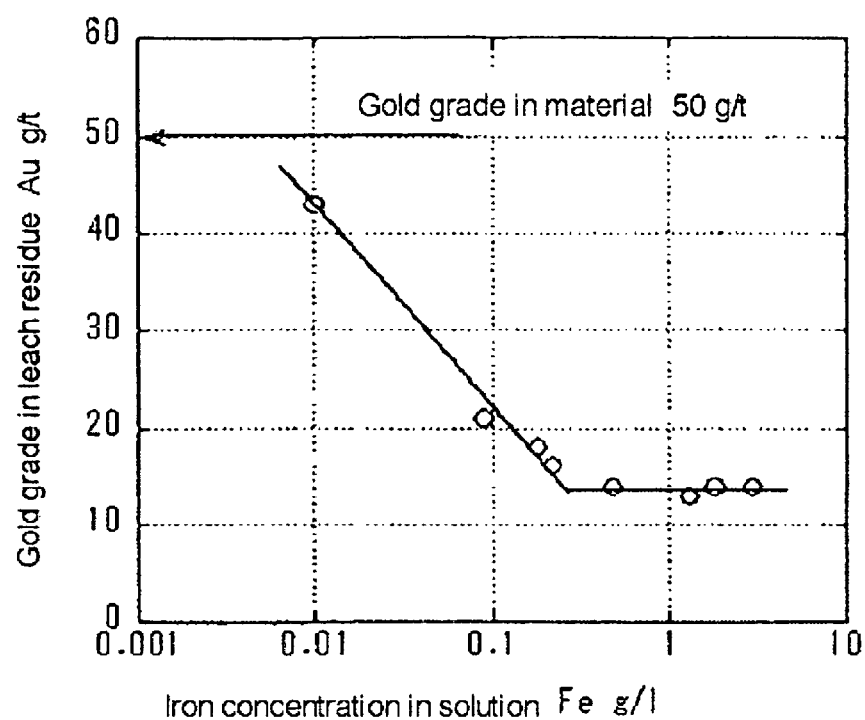
FIG. 3 is a graph that shows an effect of the iron concentration on gold leaching.

FIG. 3 is a graph illustrating the results in which the horizontal logarithmic axis indicates the iron concentration in the leaching solution while the vertical axis indicates the gold grade in the leach residue.

FIG. 3 shows that gold can be leached at an iron concentration of 0.01 g/l or more, and that as the iron concentration increases, the gold grade in the leach residue decreases until the iron concentration reaches a certain value. This suggests that as the iron concentration increases, the leaching rate also increases, while an iron concentration exceeding such a value does not affect the leaching rate. A point at the intersection of the two lines in FIG. 3 shows this iron concentration, 0.26 g/l.

Consequently, according to the gold leaching process, gold can be leached in an iron concentration of 0.01 g/l or more, and a higher iron concentration can effectively reduce the leaching time, but such effects can not observed at 0.26 g/l or more. Of course, an iron concentration of 0.26 g/l or more does not preclude the leaching.

Figure 4:
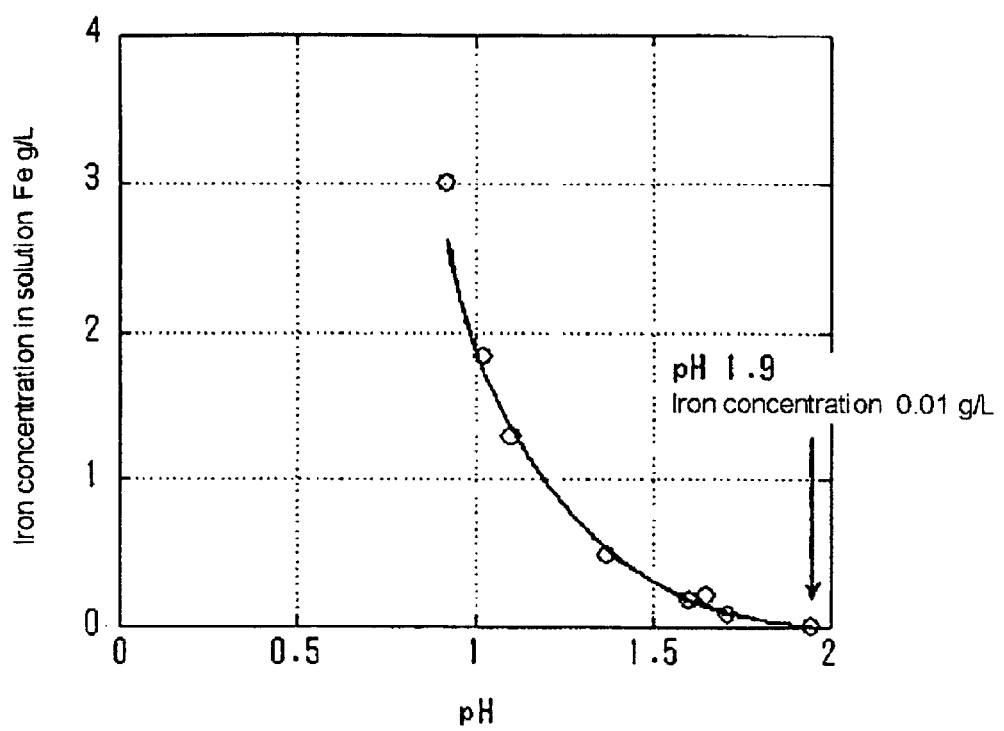
FIG. 4 is a graph that shows an effect of the pH on the iron concentration.

By air bubbling during the reaction, iron in the solution is present in the form of trivalent ions, and their solubility depends on the pH. FIG. 4 shows the effect of the pH on the iron concentration, based on the results from Example 6. As the pH increases, the iron concentration decreases. Consequently, in order to ensure the sufficient iron concentration for gold leaching, the pH must be 1.9 or less in consideration of the results shown in Table 6.

Example 7

Inventive Example and Comparative Example

A leaching solution containing cupric chloride in a copper concentration of 25 g/L, ferric chloride in an iron concentration of 5 g/L, chloride ions including those from the cupric chloride and ferric chloride in a chloride ion concentration of 180 g/L in total, and sodium bromide in a bromide ion concentration of 22 g/L was prepared. A copper leach residue having a preliminarily decreased copper grade of the copper sulfide ore was used as a material. Two types of copper leach residue were used, having copper, iron, and sulfur grades of 0.1 wt % Cu, 30 wt % Fe, and 32 wt % S, and 0.6 wt % Cu, 21 wt % Fe, and 46 wt % S, respectively.

To 2.5 L of the leaching solution described above, 630 g of each copper leach residue was added.

After heating the leaching solution to 85° C., 630 g of each leach residue was added with stirring followed by air bubbling at a flow rate of 0.2 L/min, and gold leaching.

One of the two mixtures was filtrated after 24 hours, and the resultant residue was collected, followed by analysis of the gold grade in the residue. The other was filtrated every 3 hours to collect the residue each time. Analyte was sampled from the residue to determine the gold grade in the residue. The residue collected after 3 hours was added to a fresh leaching solution, and gold was leached again from the mixture. In this way, gold leaching was repeated 8 times.

Table 7 shows the results.

TABLE 7

Results of measurement in Example 7

| | Solution not replaced | | | Solution replaced every 3 hrs | | |
|---|---|---|---|---|---|---|
| Leaching time hrs | Au grade in leach residue g/t | Leaching rate of Au % | Au concentration in solution mg/L | Au grade in leach residue g/t | Leaching rate of Au % | Au concentration in solution mg/L |
| 0 | 43 | 65.7 | 0.00 | 44 | 47.5 | 0.00 |
| 3 | — | — | — | 32 | 62.0 | 0.41 |
| 6 | — | — | — | 17 | 80.2 | 0.53 |
| 9 | — | — | — | 14 | 83.9 | 0.59 |
| 12 | — | — | — | 12 | 86.2 | 0.48 |
| 15 | — | — | — | 11 | 87.5 | 0.23 |
| 18 | — | — | — | 10 | 88.6 | 0.14 |
| 21 | — | — | — | 10 | 88.9 | 0.09 |
| 24 | 28 | 82.2 | 0.47 | 10 | 89.1 | 0.09 |

Table 7 demonstrates that while Comparative Example with the solution without replacement have a low gold leaching rate, the solution with replacement according to the present invention leads to a higher gold leaching rate, and thus the gold concentration in the solution during gold leaching significantly affects the gold leaching rate.

This suggests that keeping the gold concentration low allows the improvement in the gold leaching rate.

Example 8

Inventive Example

A leaching solution containing cupric chloride in a copper concentration of 25 g/L, ferric chloride in an iron concentration of 5 g/L, chloride ions including those from the cupric chloride and ferric chloride in a chloride ion concentration of 180 g/L in total, and sodium bromide in a bromide ion concentration of 22 g/L was prepared. A copper leach residue having a preliminarily decreased copper grade of the copper sulfide ore was used as a material. Two types of copper leach residue were used, having copper, iron, and sulfur grades of 0.6 wt % Cu, 20 wt % Fe, and 46 wt % S, and 0.5% wt Cu, 21% wt Fe, and 45% wt S, respectively.

To 2.5 L of the leaching solution described above, 630 g of each copper leach residue was added.

After heating the leaching solution to 60° C. or 85° C., 630 g of each leach residue was added with stirring followed by bubbling air at a flow rate of 0.2 L/min, and gold leaching.

The mixture was filtrated every 3 hours to collect the residue each time. Analyte was sampled from the residue to determine the gold grade in the residue. The residue collected after 3 hours was added to a fresh leaching solution, and gold was leached again from the mixture. In this way, gold leaching was repeated 15 times. Table 8 shows the results.

Table 8 shows that the gold leaching rate at 85° C. reaches 92.4% at a leaching time of 45 hours. On the other hand, a gold leaching rate at 60° C. reaches 88.9% at a leaching time of 45 hours, although the gold leaching rate at 60° C. is lower than that at 85° C.

This indicates that the temperature in gold leaching significantly affects the gold leaching rate.

Example 9

Inventive Example

A leaching solution containing cupric chloride in a copper concentration of 25 g/L, ferric chloride in an iron concentration of 5 g/L, chloride ions including those from the cupric chloride and ferric chloride in a chloride ion concentration of 180 g/L in total, and sodium bromide in a bromide ion concentration of 22 g/L was prepared. A copper leach residue having a preliminarily decreased copper grade of the copper sulfide ore (1.3 wt % Cu, 21 wt % Fe, and 45 wt % S) was used for the material. To 2.5 L of the leaching solution, 640 g of the copper leach residue was added.

After the leaching solution was heated to 85° C., the copper leach residue material and coconut shell activated carbon were added with stirring followed by air bubbling at a flow rate of 0.2 L/min, and gold leaching.

Analyte was sampled from the mixture every predetermined time interval to determine the gold grade in the leach residue. Coconut shell activated carbon having a particle size of 1 mm or more was used. In sampling, the activated carbon was sieved out from the leach residue, which was then analyzed. The activated carbon was added here in an amount to adsorb gold beyond the upper limit of its gold adsorption ability.

Table 9 shows the results.

TABLE 8

Results of measurement in Example 8

| | Leaching temperature: 85° C. | | | Leaching temperature: 60° C. | | |
|---|---|---|---|---|---|---|
| Leaching time hrs | Au grade in leach residue g/t | Leaching rate of Au % | Au concentration in solution mg/L | Au grade in leach residue g/t | Leaching rate of Au % | Au concentration in solution mg/L |
| 0 | 44 | 47.5 | 0.00 | 31 | 65.6 | 0.00 |
| 3 | 32 | 62.0 | 0.41 | 20 | 77.3 | 1.57 |
| 6 | 17 | 80.2 | 0.53 | 18 | 79.9 | 1.01 |
| 9 | 14 | 83.9 | 0.59 | 17 | 80.9 | 0.50 |
| 12 | 12 | 86.2 | 0.48 | 16 | 82.4 | 0.35 |
| 15 | 11 | 87.5 | 0.23 | 15 | 83.5 | 0.53 |
| 18 | 10 | 88.6 | 0.14 | 14 | 85.0 | 0.12 |
| 21 | 10 | 88.9 | 0.09 | 13 | 86.0 | 0.05 |
| 24 | 10 | 89.1 | 0.29 | 13 | 86.1 | 0.07 |
| 27 | 9.6 | 89.4 | 0.12 | 12 | 87.1 | 0.10 |
| 30 | 9.5 | 89.7 | 0.05 | 12 | 87.4 | 0.19 |
| 33 | 9.1 | 90.4 | 0.12 | 11 | 88.4 | 0.05 |
| 36 | 8.2 | 91.3 | 0.19 | 10 | 89.6 | 0.06 |
| 39 | 7.7 | 91.9 | 0.12 | 11 | 88.7 | 0.04 |
| 42 | 7.5 | 92.2 | 0.04 | 11 | 88.9 | 0.03 |
| 45 | 7.3 | 92.4 | 0.04 | 11 | 88.9 | 0.06 |

TABLE 9

Results of measurement in Example 9

| Leaching time hrs | Au grade g/t | Leaching rate of Au % | Au concentration in solution mg/L |
|---|---|---|---|
| 0 | 48 | 48.9 | 0.00 |
| 3 | 31 | — | 0.05 |
| 6 | 18 | — | 0.04 |
| 9 | 11 | — | 0.03 |
| 12 | 9.9 | — | 0.02 |
| 15 | 9.9 | — | 0.10 |
| 18 | 9.8 | — | 0.10 |
| 21 | 9.0 | — | 0.10 |
| 24 | 8.8 | 91.7 | 0.08 |
| 27 | — | — | — |
| 30 | 8.6 | — | 0.13 |
| 33 | — | — | — |
| 36 | 9.0 | — | 0.15 |
| 39 | — | — | — |
| 42 | 8.7 | — | 0.05 |
| 45 | — | — | — |
| 48 | 8.7 | 92.7 | 0.05 |

Table 9 shows that a gold leaching rate of Example 9 with activated carbon reaches 92.7% at a leaching time of 48 hours. This result is almost identical to that from Example 8 (85° C.) using the leach solution with replacement.

Figure 5:
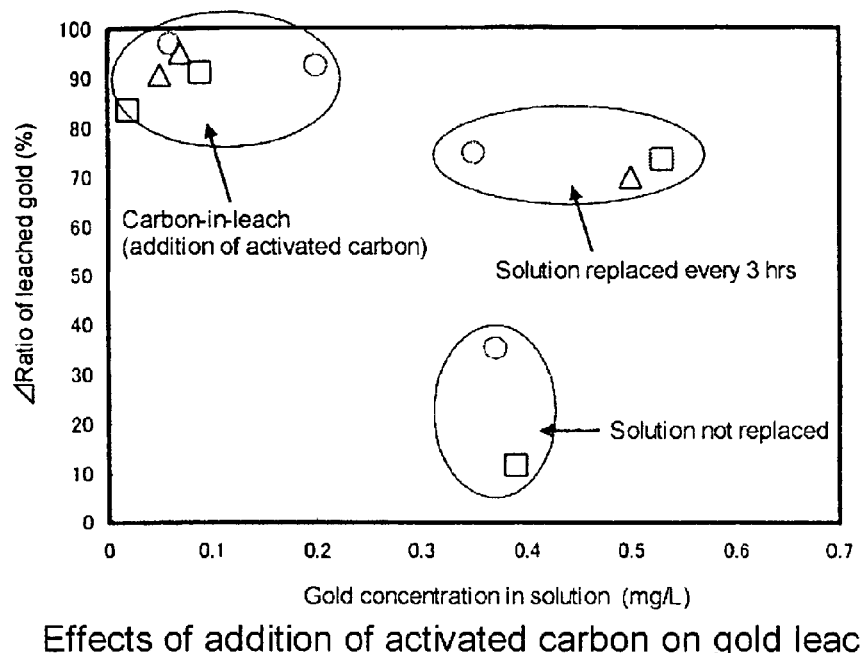
FIG. 5 is a graph that shows an effect of addition of activated carbon on gold leaching.

FIG. 5 shows that gold is readily leached while a low gold concentration is kept in the solution. The leaching test during which the leaching solution is not replaced leads to a high gold concentration and a low leaching rate in the solution. It is found that keeping the gold concentration in the solution low by replacing the solutions or by adding activated carbon improves the gold leaching rate. An improvement in the gold leaching rate can reduce the leaching time, and as a result, gold can be efficiently leached.

Example 10

Inventive Example

A leaching solution containing cupric chloride in a copper concentration of 25 g/L, ferric chloride in an iron concentration of 5 g/L, chloride ions including those from the cupric chloride and ferric chloride in a chloride ion concentration of 180 g/L in total, and sodium bromide in a bromide ion concentration of 22 g/L was prepared. A copper leach residue having a preliminarily decreased copper grade of the copper sulfide ore (0.4 wt % Cu, 25 wt % Fe, and 37 wt % S) was used as a material. To 2.5 L of the leaching solution, 690 g of the copper leach residue was added.

After the leaching solution was heated to 85° C., the residue material and coconut shell activated carbon were added with stirring followed by air bubbling at a flow rate of 0.2 L/min, and gold leaching. Analyte was sampled from the mixture every predetermined time interval to determine the gold grade in the leach residue. Coconut shell activated carbon having a particle size of 1 mm or more was used. In sampling, the activated carbon was sieved out from the leach residue, which was then analyzed. The activated carbon was added here in an amount to adsorb gold beyond the upper limit of its gold adsorption ability. Lead nitrate, which is known for facilitating the gold leaching by cyanidation, was added in an amount of 0.21 g on the basis of cyanidation.

Figure 6:
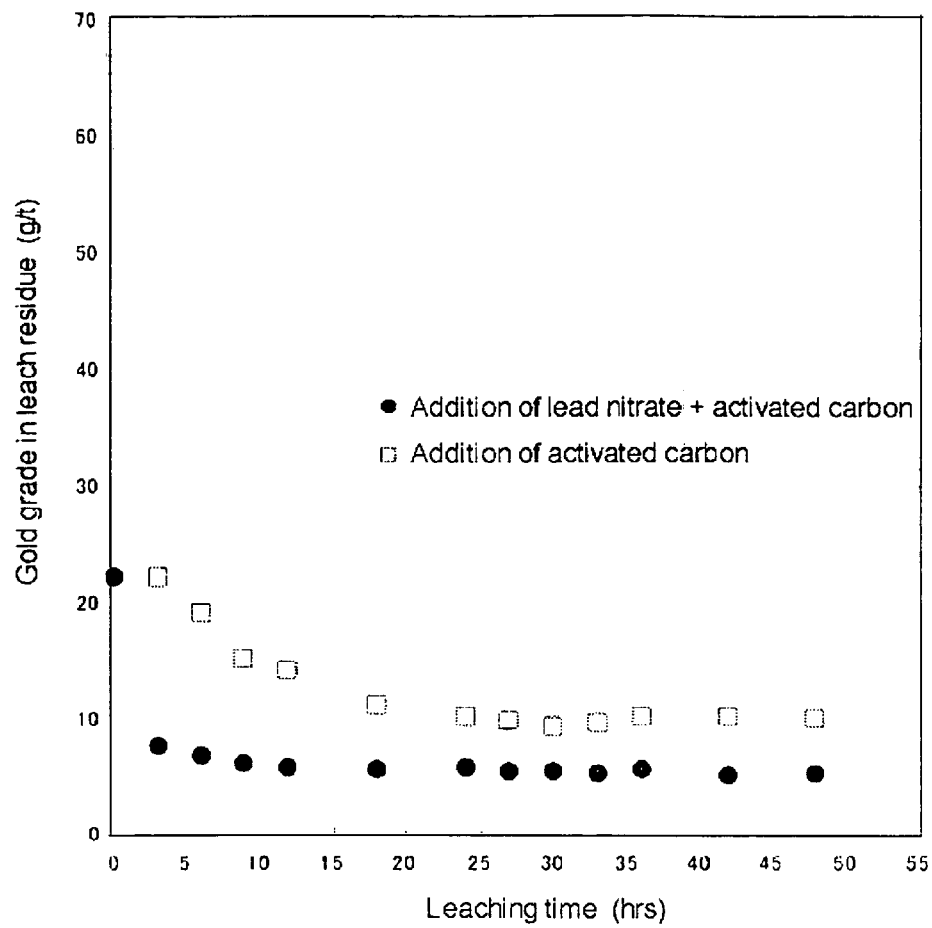
FIG. 6 is a graph that shows an effect of addition of lead nitrate on gold leaching.

Table 10 shows the results from Example 10, and FIG. 6 a change in the gold grade in the leach residue in the presence of lead nitrate.

TABLE 10

Results of measurement in Example 10

| Leaching time hrs | Au grade in leach residue g/t | Leaching rate of Au % | Au concentration in solution mg/L |
|---|---|---|---|
| 0 | 22 | 73.0 | 0.00 |
| 3 | 7.4 | — | 0.14 |
| 6 | 6.6 | — | 0.09 |
| 9 | 5.9 | — | 0.07 |
| 12 | 5.6 | — | 0.06 |
| 15 | — | — | — |
| 18 | 5.4 | — | 0.01 |
| 21 | — | — | — |
| 24 | 5.6 | 93.2 | 0.01 |
| 27 | 5.2 | — | 0.04 |
| 30 | 5.3 | — | 0.02 |
| 33 | 5.0 | — | 0.03 |
| 36 | 5.4 | — | 0.02 |
| 39 | — | — | — |
| 42 | 4.9 | — | 0.02 |
| 45 | — | — | — |
| 48 | 5.1 | 95.1 | 0.02 |

Table 10 shows that the gold leaching rate reaches 93.2% at the leaching time of 24 hours, and 95.1% at the leaching time of 48 hours.

FIG. 6 shows that the gold grade in the leach residue plummets more rapidly in the presence of lead nitrate. This elucidates the accelerated effect of lead nitrate on gold leaching.

Example 11

Inventive Example

A leaching solution containing cupric chloride in a copper concentration of 25 g/L, ferric chloride in an iron concentration of 5 g/L, c chloride ions including those from the cupric chloride and ferric chloride in a chloride ion concentration of 180 g/L in total, and sodium bromide in a bromide ion concentration of 22 g/L was prepared. A copper leach residue having a preliminarily decreased copper grade of the copper sulfide ore was used as a material. Gold was leached by adding the material to 2.5 L of the leaching solution with the above composition to set the pulp concentration to 200 g/L, followed by constantly bubbling air at a flow rate of 0.2 L/min with stirring.

The material which was subject to grinding in a pot mill prior to copper leaching (particle size: P80 value, 40 μm) and the material (particle size: P80 value, 185 μm) were used.

After the leaching solution was heated to 85° C., the residue material and coconut shell activated carbon were added with stirring followed by sampling analyte with further stirring, and analysis of the gold grade in the leach residue. Coconut shell activated carbon having a particle size of 1 mm or more was used. For analysis, the activated carbon was sieved out from the leach residue, which was then analyzed.

Figure 7:
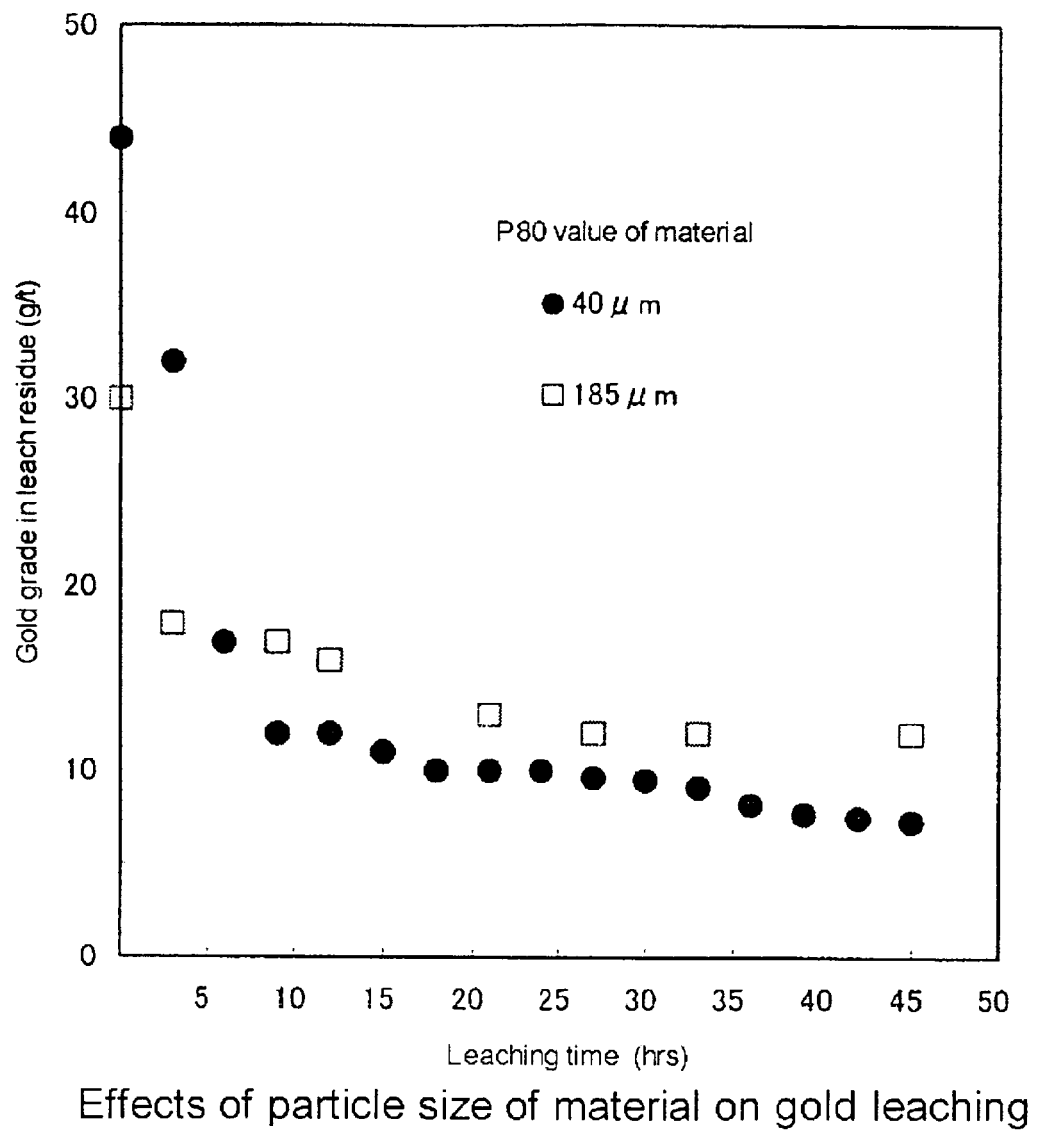
FIG. 7 is a graph that shows an effect of the particle size of the material on gold leaching.

Table 11 shows the results from Example 11, and FIG. 7 a change in the gold grade in the leach residue.

TABLE 11

Results of measurement in Example 11

| Leaching time hrs | Particle size | | | |
|---|---|---|---|---|
| | 40 μm | | 185 μm | |
| | Au grade in leach residue g/t | Leaching rate of Au % | Au grade in leach residue g/t | Leaching rate of Au % |
| 0 | 44 | 47.5 | 30 | 11.4 |
| 3 | 32 | 62.0 | 18 | — |
| 6 | 17 | 80.2 | 15 | — |
| 9 | 14 | 83.9 | 17 | — |
| 12 | 12 | 86.2 | 16 | — |
| 15 | 11 | 87.5 | 13 | — |
| 18 | 10 | 88.6 | — | — |
| 21 | 10 | 88.9 | 13 | — |
| 24 | 10 | 89.1 | — | — |
| 27 | 9.6 | 89.4 | 12 | — |
| 30 | 9.5 | 89.7 | — | — |
| 33 | 9.1 | 90.4 | 12 | — |
| 36 | 8.2 | 91.3 | — | — |
| 39 | 7.7 | 91.9 | 14 | — |
| 42 | 7.5 | 92.2 | — | — |
| 45 | 7.3 | 92.4 | 12 | 82.1 |

FIG. 11 shows that the gold leaching rate reaches 92.4% at the leaching time of 45 hours in the presence of the material having a P80 value of 40 μm as the particle size, whereas the rate reaches merely 82.1% at the same leaching time of 45 hours in the presence of the material having a P80 value of 185 μm as the particle size.

FIG. 7 shows that gold leaching is stagnated at a gold grade in the presence of the crude particle material, whereas gold leaching is further proceeded in the presence of the fine particle material. This indicates that the particle size of the material significantly affects the gold leaching rate.

The process of leaching gold according to the present invention does not require expensive or hazardous chemicals or special potential enhancers such as Halex. In the present invention, combined use of gold leaching and other processes such as adsorption with activated carbon can decrease the gold concentration in the leaching solution, and facilitate the ongoing gold leaching to reduce the leaching time, which is highly preferred for practical use.

What is claimed is:

1. A process of leaching gold comprising the steps of:
    a) leaching copper from copper sulfide ore material that contains gold or contains silicate ore containing gold until the copper grade is reduced to 7.9 wt % or less;
    b) mixing the resulting material having a copper grade of 7.9 wt % or less with a gold leaching solution selected from the group consisting of a first solution containing chloride ions and ferric ions, and a second solution containing chloride ions and iron ions, the iron ions having been oxidized to trivalent ferric ions by air bubbled into the second solution; and
    c) adjusting the pH of the gold leaching solution to 1.9 or less with stirring to leach at least gold in the material after step b) into the gold leaching solution by the oxidative activity of the ferric ions contained in the gold leaching solution, wherein the concentration of gold is reduced by selectively removing gold from part or all of the gold leaching solution by adding activated carbon to the gold leaching solution during gold leaching, and optionally adding lead nitrate.

2. A process of leaching gold comprising the steps of:
    a') leaching copper from copper sulfide ore material that contains gold or contains silicate ore containing gold until the copper grade is reduced to 7.9wt % or less by a leaching solution containing chloride ions and iron ions to form a third solution (hereafter called "gold leaching solution");
    b') oxidizing the gold leaching solution by bubbling with air to oxidize iron ions into trivalent ferric ions by the action of oxygen contained in the air; and
    c) adjusting the pH of the gold leaching solution to 1.9 or less with stirring to leach at least gold in the material after step b') into the gold leaching solution by the oxidative activity of the ferric ions contained in the gold leaching solution, wherein the concentration of gold is reduced by selectively removing gold from part or all of the gold leaching solution by adding activated carbon to the gold leaching solution during gold leaching, and optionally adding lead nitrate.

3. The process according to claim 1 or 2, wherein the gold leaching solution contains copper ions.

4. The process according to claim 1 or 2, wherein the gold leaching solution contains bromide ions.

5. The process according to claim 1 or 2, wherein the gold leaching solution contains iron ions in a concentration of 0.01 g/l or more.

6. The process according to claim 1 or 2, further comprising bubbling the gold leaching solution with air which oxidizes divalent iron ions into trivalent iron ions during said stirring.

7. The process according to claim 1 or 2, wherein the gold leaching solution contains chloride ions and bromide ions in a concentration of 120 g/L to 200 g/L in total.

8. The process according to claim 1 or 2, wherein a leaching temperature is 60° C. or more.

9. The process according to claim 1 or 2, further comprising comminuting the material until 80% or more of the material have a particle size of 40 μm or less before starting step a) or before starting step a').

* * * * *